(12) United States Patent
Mateo et al.

(10) Patent No.: US 9,664,578 B2
(45) Date of Patent: May 30, 2017

(54) DEVICE FOR CARRYING OUT TESTS ON AT LEAST ONE FLUID CIRCUIT OF AN AIRCRAFT

(71) Applicant: Airbus Operations SAS, Toulouse (FR)

(72) Inventors: Stéphane Mateo, Dieupentale (FR);
Bernard Courthieu, Auterive (FR);
Ludovic Zimmermann, Frouzins (FR)

(73) Assignee: Airbus Operations SAS (FR)

( * ) Notice: Subject to any disclaimer, the term of this patent is extended or adjusted under 35 U.S.C. 154(b) by 696 days.

(21) Appl. No.: 13/798,495

(22) Filed: Mar. 13, 2013

(65) Prior Publication Data

US 2013/0192345 A1    Aug. 1, 2013

Related U.S. Application Data

(63) Continuation of application No. PCT/FR2011/052088, filed on Sep. 13, 2011.

(30) Foreign Application Priority Data

Sep. 17, 2010    (FR) .................................... 10 57465

(51) Int. Cl.
*F15B 19/00* (2006.01)
*G01L 5/28* (2006.01)
*G01M 3/28* (2006.01)
*G01M 3/02* (2006.01)

(52) U.S. Cl.
CPC .............. *G01L 5/28* (2013.01); *F15B 19/005* (2013.01); *G01M 3/02* (2013.01); *G01M 3/28* (2013.01)

(58) Field of Classification Search
CPC .......... B64F 5/0045; G01L 5/28; G01M 3/28; G01M 3/02; F15B 19/00; F15B 19/005
See application file for complete search history.

(56) References Cited

U.S. PATENT DOCUMENTS

| | | | |
|---|---|---|---|
| 2,332,725 A | | 10/1943 | Jordan |
| 2,364,709 A | * | 12/1944 | Greer .................... F15B 19/005 73/168 |
| 2,478,938 A | * | 8/1949 | Osterhus ................ F15B 19/00 73/1.58 |
| 2,509,816 A | | 5/1950 | Elson |
| D194,588 S | * | 2/1963 | Brock ............................. D12/1 |
| 3,418,843 A | * | 12/1968 | Bosshart ............... B64F 5/0045 73/37 |

(Continued)

FOREIGN PATENT DOCUMENTS

| | | |
|---|---|---|
| EP | 1300666 A2 | 4/2003 |
| KR | 20020069746 A * | 9/2002 |

*Primary Examiner* — David A Rogers
(74) *Attorney, Agent, or Firm* — Lerner, David, Littenberg, Krumholz & Mentlik, LLP (57) ABSTRACT

A device for carrying out a test on a fluid circuit of an aircraft including a test unit which includes, at the inlet, at least one means of connection to a pressurized gas supply connected to means for regulating the pressure of the gas provided by the supply as a function of the test to be carried out and, at the outlet, at least two connection means connected to the means for regulating the pressure of the gas, wherein at least two connection means have different dimensions tailored to a range of pressures or a given pressure.

10 Claims, 6 Drawing Sheets

(56) References Cited

U.S. PATENT DOCUMENTS

| | | | |
|---|---|---|---|
| 3,748,898 A * | 7/1973 | Hellouin de Menibus | F15B 19/00 73/168 |
| 4,821,217 A * | 4/1989 | Jackson | G01M 15/14 701/3 |
| 5,023,791 A * | 6/1991 | Herzberg | G05B 23/0283 324/73.1 |
| 5,079,707 A * | 1/1992 | Bird | G01R 35/005 324/73.1 |
| 5,111,402 A * | 5/1992 | Brooks | G01R 31/008 324/73.1 |
| 5,260,874 A * | 11/1993 | Berner | G09B 9/24 434/242 |
| 5,279,152 A * | 1/1994 | Griffin | B60T 8/885 73/121 |
| 5,540,083 A | 7/1996 | Sato et al. | |
| 5,893,398 A * | 4/1999 | Garrett, Jr. | B64F 1/28 137/312 |
| 6,349,601 B1 * | 2/2002 | Losee | B64F 5/0045 73/714 |
| 6,384,488 B1 * | 5/2002 | Bucharelli | H02M 7/003 307/10.1 |
| 7,331,244 B1 | 2/2008 | Little et al. | |

\* cited by examiner

DEVICE FOR CARRYING OUT TESTS ON AT LEAST ONE FLUID CIRCUIT OF AN AIRCRAFT

CROSS-REFERENCE TO RELATED APPLICATIONS

The present application is a continuation of International Application No. PCT/FR2011/052088, filed Sep. 13, 2011, which claims priority from French Patent Application No. 10 57465, filed Sep. 17, 2010, the disclosures of which applications are hereby incorporated herein by reference.

BACKGROUND OF THE INVENTION

The present invention relates to a device for carrying out tests or experimentations on at least one fluid circuit of an aircraft.

For the remainder of the description, a fluid circuit is to be understood as at least one conduit portion and/or a reservoir in which a fluid, namely a liquid or gas, circulates and/or is stored. By way of example, the fuel tank of an aircraft can be assimilated to a fluid circuit according to the invention.

During the assembly or at the end an aircraft is assembled, or when it is running, it is necessary to test certain fluid circuits in order to verify their state, particularly their sealing.

To this end, the fluid circuit undergoes a pressure cycle.

For the remainder of the description, pressure refers to pressure greater than atmospheric pressure just as well as lower pressure. Cycle is to be understood as constant pressure just as well as pressure that varies as a function of time. Thus, the fluid circuit can be subjected to a substantially constant pressure for a certain duration or can be subjected to a pressure that varies, for example which increases up to a certain threshold, which remains constant for a while and then decreases.

So as to be tested, a fluid circuit comprises connection means, for example a quick-connection system.

As a function of the type of aircraft, of the fluid circuit, and of the test to be performed, the operator uses a tool suitable to connect a fluid source to the connection means. As a function of the test, the fluid test can vary. By way of example, the fluid source can be a compressed air network or a bottle containing pressurized gas (nitrogen, helium . . . ). The tool comprises a conduit with at one end, means of connection to the fluid circuit to be tested and, at the other end, means of connection to a fluid source, a pressure-reducing valve to regulate the pressure or change it as a function of the test to be performed, as well as a manometer to control pressure. This tool is generally stored in a test unit.

For reasons of test conditions, and particularly because of the presence of pressurized gas, this tool requires a certification.

According to another aspect, particularly because of the pressures which are different from one test to another, it is necessary to provide a tool adapted to the test.

According to another point, it is necessary to provide, for each type of airplane, a series of test units, each dedicated to a test.

This management is not entirely satisfactory. Indeed, considering the number of airplane types, the number of fluid circuits to be tested on each airplane type, it is necessary to provide a large number of test units, which leads to substantial costs in terms of certification, manufacturing, and downtime. In addition, it is necessary to provide a large storage area for all these tools.

The tool diversity is even more problematic during the maintenance and fault rectification phases since it is necessary, at that time, to transport a large number of tools or to limit the number thereof by taking the risk to not have the correct tool on site.

BRIEF SUMMARY OF THE INVENTION

Therefore, an aspect of the present invention may overcomes the drawbacks of the prior art by providing a versatile device to perform different tests on different fluid circuits of different aircraft.

An embodiment of the invention is a device for carrying out a test on a fluid circuit of an aircraft comprising a test unit which comprises, at the inlet, at least one means of connection to a pressurized gas supply connected to means for regulating the pressure of the gas provided by the supply as a function of the test to be carried out and, at the outlet, at least two connection means connected to the means for regulating the pressure of the gas, characterized in that at least two connection means have different dimensions tailored to a range of pressures or a given pressure.

BRIEF DESCRIPTION OF THE DRAWINGS

Other characteristics and advantages will become apparent from the description that follows, a description given only by way of example, with reference to the annexed drawings, wherein.

DETAILED DESCRIPTION

Figure 1:
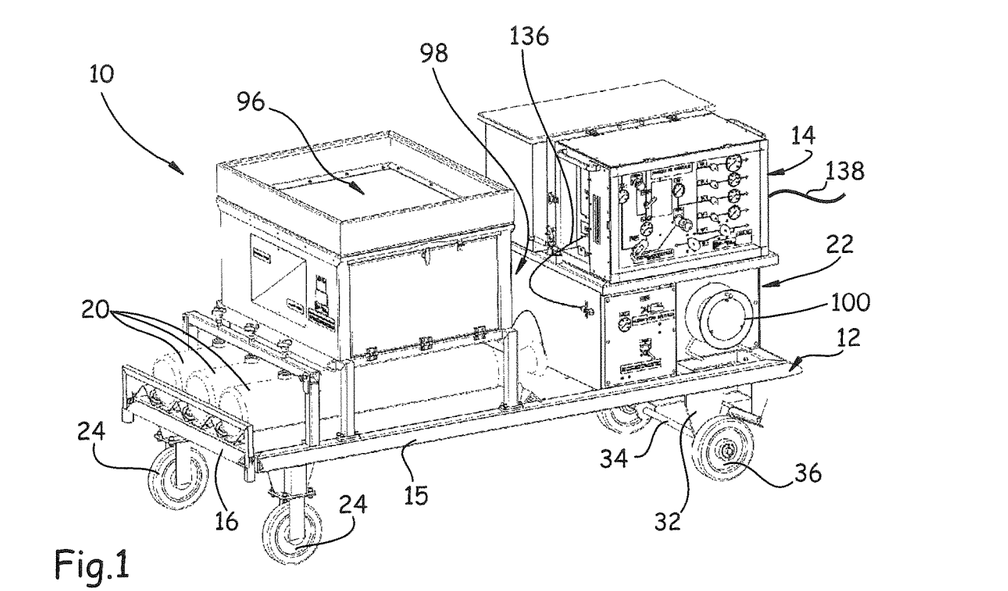
FIG. 1 is a perspective view of the complete test stand according to an embodiment of the invention, along a first direction.
Figure 2:
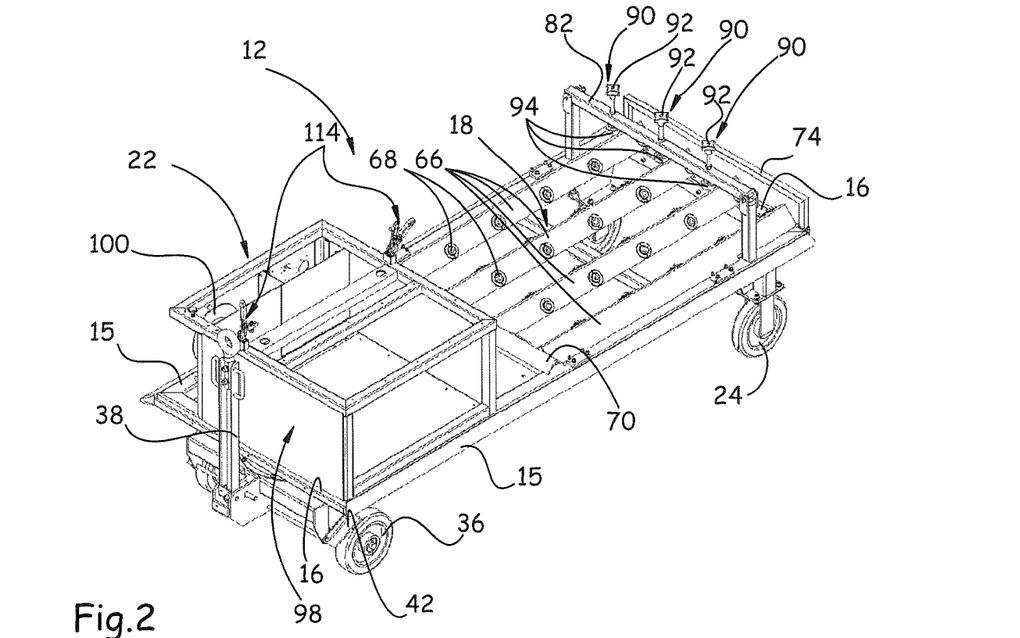
FIG. 2 is a perspective view of the test stand without the removable test unit provided for managing the fluids along another direction.

FIGS. 1 and 2 show a test stand 10 to carry out tests on different fluid circuits of different aircraft. This test stand is also referred to as a device for carrying out tests on at least one fluid circuit of an aircraft.

This stand comprises a carriage 12 to which a test unit 14 for managing fluids is removably attached.

The carriage 12 comprises a chassis with stringers 15 and cross-beams 16 so as to define a frame. The chassis comprises, at the rear, means 18 for supporting at least one pressurized gas reservoir 20, such as, for example, one or several pressurized gas bottles, particularly nitrogen or helium (the bottles 20 are shown in dot-and-dash lines in FIG. 1) and, at the front, means 22 for supporting the test unit 14.

So as to be moved, the carriage 12 comprises rolling means in the form of two rear wheels 24 and a front axle 26.

The connection between the rear wheels 24 and the carriage is not further described since it is relatively simple and known to one having ordinary skill in the art.

Figures 7, 8:
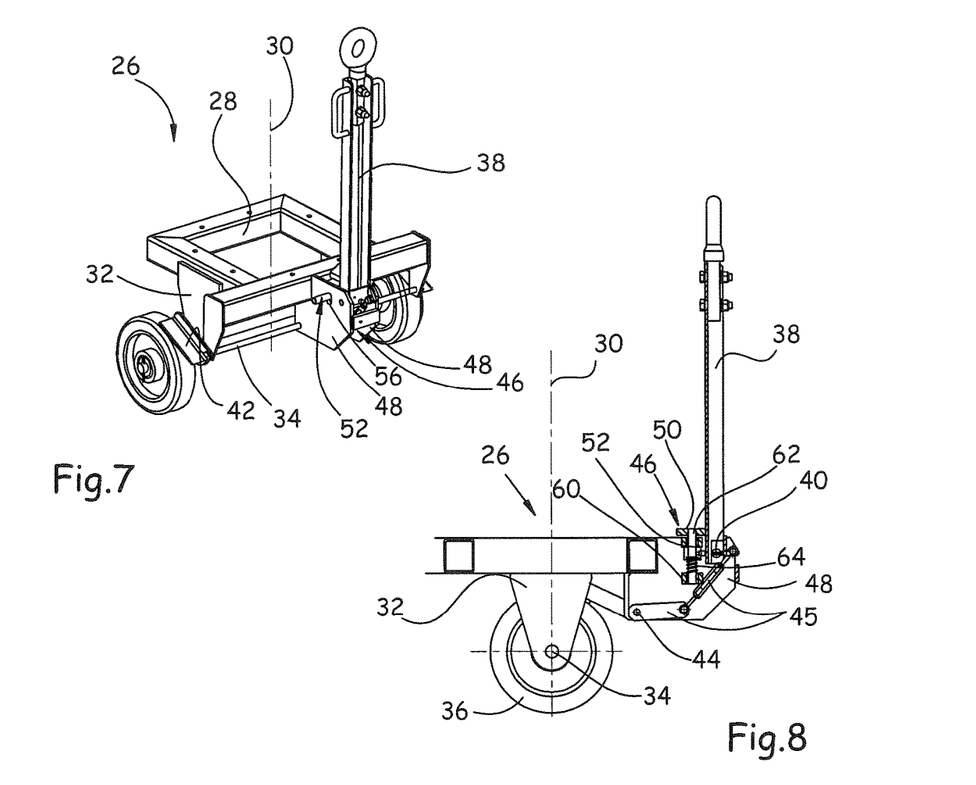
FIG. 7 is a perspective view of an embodiment of the front axle of the test stand.
FIG. 8 is a cross-sectional view of the front axle of FIG. 7.

As shown in FIGS. 7 and 8, the front axle 26 is preferably directional and comprises a frame 28 arranged under the chassis capable of pivoting about a vertical axis 30 with respect to the chassis, said frame comprising, in the area of the two opposite sides the cheeks 32 supporting a shaft 34 at each end of which wheels 36 are pivotally mounted and in the area of a third side, a tiller 38 allowing for the test stand to be pulled.

This tiller 38 is preferably articulated with respect to the frame 28 and can particularly pivot about an axis 40 substantially parallel to the shaft 34 supporting the wheels 36. This pivoting movement makes it possible to pull up the tiller during parking to save space. This pivoting movement also has the function of activating or deactivating a brake system.

Advantageously, the front axle 26 comprises a brake system, particularly brake pads 42 affixed at each end of a shaft 44 parallel to the shaft 34, said shaft being able to pivot with respect to the frame so the brake pads are in contact, or not, with the wheels 36.

The pivoting of the shaft 44 is subject to the pivoting movement of the tiller 38 by means of link rods 45. Thus, when the tiller 38 is pulled up, the brake pads 42 are in contact with the wheels 36 and the brake system is activated. When the tiller 38 is arranged horizontally, the brake pads 42 are spaced away from the wheels 36 and the brake system is not activated.

Locking means 46 enable the tiller to be maintained in the upward position and, consequently, the brake system to be activated.

Figure 9:
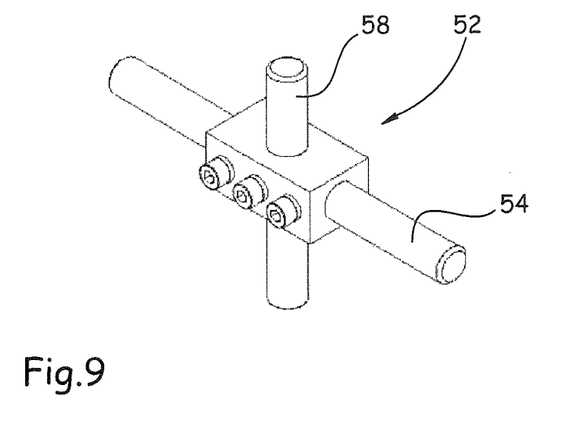
FIG. 9 is a cross-sectional view of a cross pin provided in the area of the front axle of FIG. 7.

According to an embodiment, the frame 28 comprises two plates 48 arranged perpendicularly to the shafts 34 and 44 between which the axis 40 extends, around which the tiller 38 can pivot. The latter comprises a plate 50 which extends along a vertical plane when the tiller 38 is pulled down and along a horizontal plane when the tiller is pulled up. The locking means 46 comprise a cross pin 52 with, on the one hand, an axis 54 referred to as a horizontal axis, parallel to the pivoting axis 40 being house in oblong holes 56 housed in the plates 48 and oriented vertically so that the cross pin 52 can move vertically in translation and, on the other hand, an axis referred to as a vertical axis 58, whose lower end can slide in a bearing 60 affixed to the plates 48 so as to guide the cross pin along a vertical direction and whose other end, referred to as an upper end, can be housed in a housing 62 arranged in the plate 50 affixed to the tiller. Return means (for example a spring) allow the cross pin 52 to be maintained in a high position.

When the operator lifts the tiller and the latter moves closer to the vertical position, the plate 50 tends to push the cross pin 52 downward against return means 64, the cross pin being guided by the bearing 60 and the oblong holes 56. When the tiller reaches the vertical position, the housing 62 is arranged at the level of the axis 58 of the cross pin, which means that the latter moves upward in translation due to the action of the return means 64. The end of the vertical axis 58 of the cross pin is housed in the housing 62 and maintains the tiller in a raised position, which ensure the brake system is kept in the activated state. To lower the tiller and deactivate the brake system, a force must be exerted downward on the cross pin 52 against the spring 64, for example by pushing on at least one of the ends of the horizontal axis 54 which extends on both sides of the plates 48. In this case, the end of the vertical axis 58 of the cross pin 52 no longer cooperates with the housing 62 and releases the tiller 38.

The cross pin 52 allows the brake system to be safely activated and deactivated, since the operator can use his foot to push on the ends of the cross pin 52 to maneuver it.

The invention is not limited to this particular embodiment of the front axle and/or of the brake system. Other embodiments can be envisioned by one skilled in the art.

Figure 10:
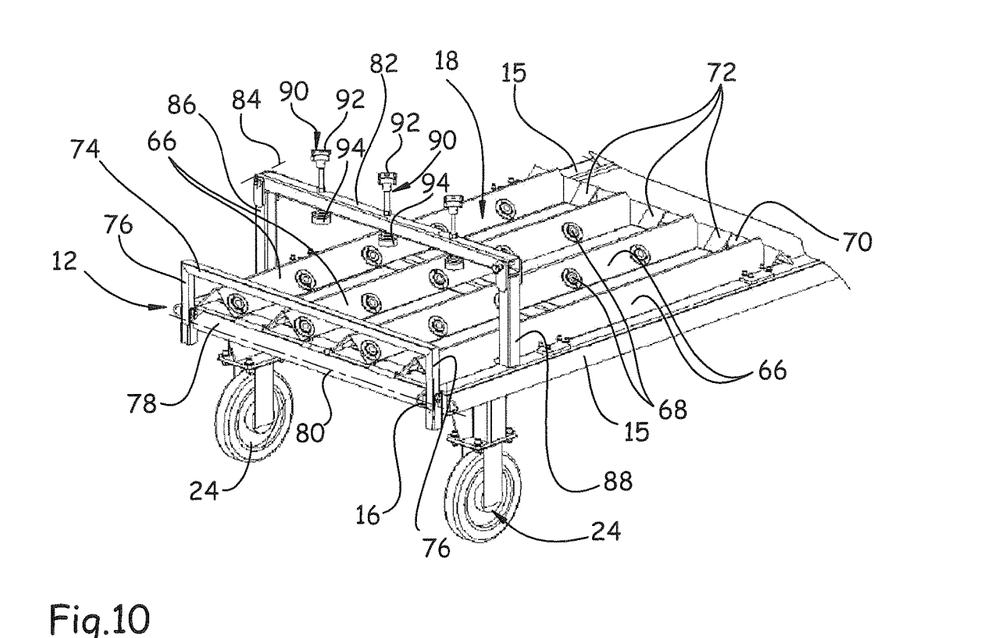
FIG. 10 is a view of the rear of an embodiment of the test stand.

According to an embodiment shown in detail in FIGS. 2 and 10, the means 18 for supporting at least one gas reservoir 20 are in the form, for each reservoir, of two parallel angle plates 66 arranged parallel to the stringers 15 of the chassis, the ends of the wings of each angle plate being affixed to the chassis by welding and the edge connecting the two wings of each angle plate being oriented upward.

According to an alternative, the chassis comprises four angle plates 66 for maintaining three reservoirs in the form of bottles.

The surfaces of the wings oriented upward, capable of being in contact with the bottles 20 advantageously comprise transfer balls 68 to facilitate the gliding of the bottles 20 on the angle plates 66 when they are set in place or removed.

To limit movement toward the front of the bottles 20 along the angle plates 26, the chassis comprises at the front of the angle plates 66 at least one abutment 70. According to an embodiment, the abutment 70 is in the form of an angle plate substantially identical to the angle plates 66 which extend approximately over the width of the carriage, oriented perpendicularly to the stringers 15. The ends of the wings of the angle plate 70 are affixed to the chassis by welding and the edge connecting the two wings is oriented upward. Advantageously, the wing surface of the angle plate 70 capable of being in contact with the bottle or bottles comprises at least one coating 72 made of plastic material to dampen the contact of the bottles against the abutment 70. Preferably, this coating 72 does not extend over the entire surface of the angle plate but rather is in the form of plates provided in the area of the contact zones with the bottles.

To limit the rearward movement of the bottles 20 along the angle plates 66, the carriage comprises, at the rear, a movable rod 74 capable of taking support against the end of the bottles 20. According to an embodiment, this movable rod 74 comprises, at each end, posts 76 articulated with respect to the rear cross-beam 16 of the chassis along a rotational axis 80. Locking means are provided to maintain the movable rod 74 supported against the bottles.

The means for immobilizing the reservoirs 20 in translation with respect to the carriage are not further described since they are known to one having ordinary skill in the art and can have different configurations.

In addition to the immobilization means, the carriage can comprise means for flattening the reservoirs 20 against the chassis.

According to an embodiment, a retractable rod 82 is provided above the reservoirs 20, arranged perpendicularly to the stringers 15, over the entire width of the carriage, one of the ends of said retractable rod 82 being pivotally mounted about a horizontal axis 84 parallel to the stringers 15 provided at the end of a vertical post 86 provided on a lateral side of the carriage, the other end being locked, or not, at the upper end of another vertical post 88 provided on the other lateral side of the carriage.

Thus, in a retaining position, the retractable rod 82 is arranged above the reservoirs 20, substantially parallel to the chassis, whereas in the retracted position, after pivoting about the axis 84, the rod is offset with respect to the carriage and releases the reservoirs.

The retractable rod 82 preferably comprises at least one retainer-screw 90 capable of being screwed in a nut affixed to said retractable rod 82, the retainer-screw comprising, at a first end located above said rod 82, a button 92 to maneuver it and, at the other end located under the rod 82, a pad 94 capable of taking support against the reservoir 20. The retractable rod 82 comprises as many retainer-screws 90 as there are reservoirs.

Advantageously, the carriage comprises above the means 18 for supporting at least one reservoir of gas 20, a storage compartment 96 for the accessories required for the experimentations.

The storage compartment, the means for supporting the reservoirs 20 are not further described as they are known to one having ordinary skill in the art and can have different configurations.

The means 22 for supporting the test unit 14 provided at the front of the carriage can be in the form of a box 98 providing, in the upper portion, a surface or a frame against which the test unit can take support. This box 98 can be used to store accessories required for the tests. This box 98 comprises, at the front, a clearance housing, in the area thereof a spool 100 around which a cable is wrapped with, in the area of its free end, a clamp to connect it to a grounded source and whose other end is connected to the metallic portions of the carriage, the latter being all connected together by metal braids so as to have the same potential.

Figure 3:
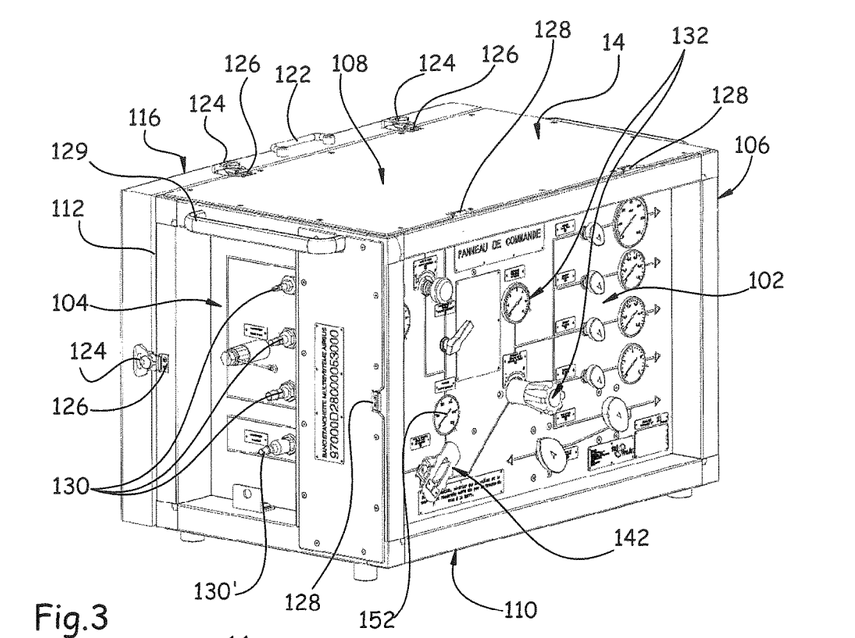
FIG. 3 is a perspective view of the test unit for managing only the fluids showing the front surface and the left surface.
Figure 4:
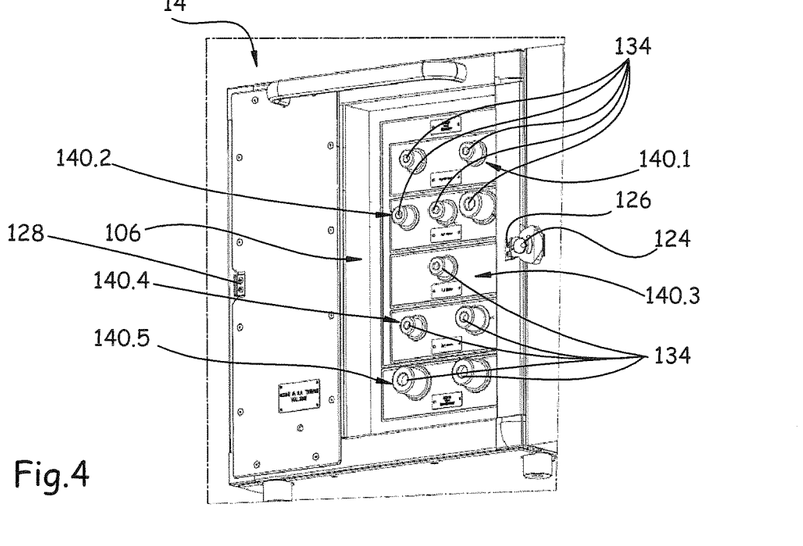
FIG. 4 is a perspective view showing the right surface of the test unit shown in FIG. 3.

The test unit 14 has the shape of a parallelepipedon with a front surface 102, a left surface 104, a right surface 106, a top surface 108, a bottom surface 110, and a rear surface 112.

The bottom surface 110 is capable of taking support against the box 98. Immobilization means 114 are provided to secure the test unit on the carriage, for example cleat-type hooks provided in the area of the box 98 capable of cooperating with notches provided in the area of the test unit.

However, other means could be used to secure the test unit on the carriage.

The test unit 14 comprises a cover 116 to protect its front surface 102. The cover shown alone in FIG. 11 comprises a bottom 118 whose dimensions correspond to those of the front surface 102 with lateral walls 120 capable of cooperating with the periphery of the front surface 102 and to extend along the top, bottom, left, and right surfaces of the test unit.

Figure 11:
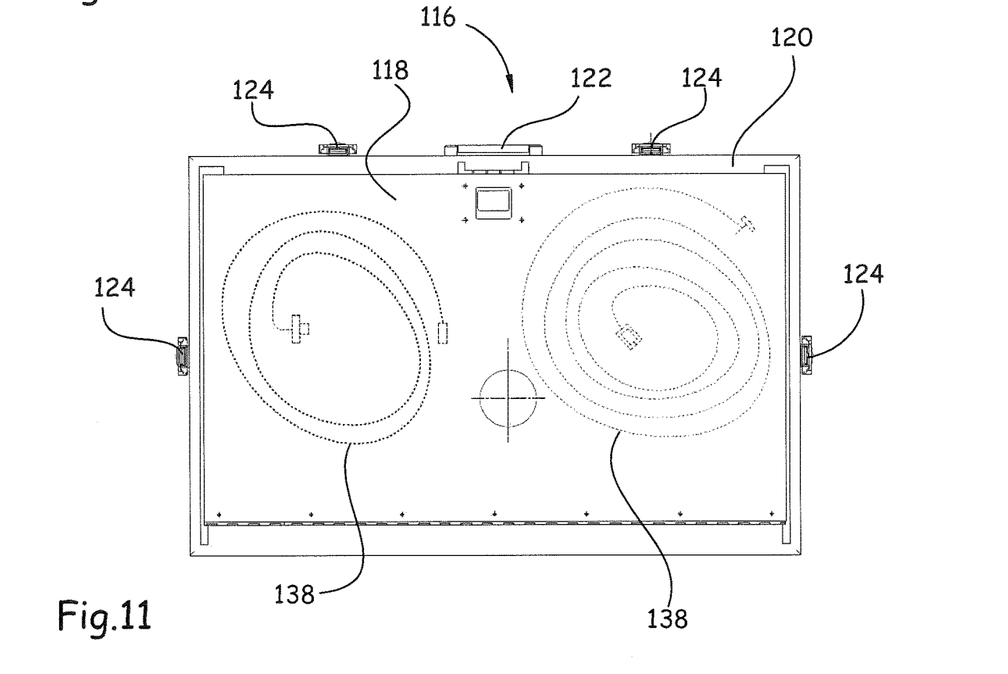
FIG. 11 is a front view of a protective cap of the front surface of the test unit.

The cover 116 comprises, in the area of the upper lateral wall, a handle 122 to manipulate it. It further comprises, in the area of the lateral walls, hooks 124 capable of cooperating with notches 126 (shown in FIGS. 3 and 4) provided in the area of the top, left, and right surfaces of the test unit in the vicinity of the front surface of the test unit. Advantageously, the test unit 14 comprises notches 128 (shown in FIGS. 3 and 4) capable of cooperating with the hooks 124 in the area of the top, left, and right surfaces of the test unit in the vicinity of the rear surface of the test unit to enable the cover to cover the front surface in transport and storage modes and to cover the rear surface of the test unit in operation mode, as shown in FIG. 3.

This cover can be used to store accessories, such as, for example, hoses which are removably affixed in the area of the bottom surface oriented toward the test unit.

Alternatively, the test unit can be devoid of a cover or comprise a cover different from that previously described.

To manipulate the test unit, the latter comprises two handles 129 provided in the area of the left and right surfaces in the vicinity of the top surface.

The test unit ensures the management of gas flows to carry out the tests on different fluid circuits of different types of aircraft.

To this end, the test unit comprises, at the inlet, at least one means of connection 130 to a pressurized gas supply, means 132 for regulating gas pressure, and at the outlet, at least two different connection means 134 connected to the means 132, the connection means 134 being adapted each to a pressure range or to a given pressure.

The connectors 134 provided at the outlet are quick-connection systems, for example sold by the company "Staubli", and have different dimensions as a function of the pressure of the gas circulating via the connector.

Providing, at the outlet, at least two different connectors 134, each adapted to a pressure range or to a given pressure, makes it possible to perform at least two types of tests, and consequently to not have a test unit adapted to each test as in the prior art.

The fluid circuit further comprises a connection means of the quick-connection type in the form of a connector whose dimensions are adapted as a function of the pressure, admissible in said fluid circuit.

As a complement to the test unit, the test stand comprises at least one hose referred to as an inlet hose 136 to connect a pressurized gas supply by means of a connection 130 and at least one hose referred to as an outlet hose 138 to connect one of the connectors 134 by means of a connection provided in the area of the fluid circuit to be tested.

According to the invention, the outlet hose 138 has, at each end, identical connectors intended for the same pressure or same pressure range. Thus, connecting mistakes are avoided since the operator can connect only the outlet connector 134 whose pressure or pressure range is adapted to the fluid circuit to be tested insofar as the outlet connector of the test unit, the connectors of the outlet hose 138 and the inlet connector of the fluid circuit to be tested are all identical and adapted to the same pressure range or to the same pressure.

According to the example shown in FIG. 4, the test unit comprises five families of connectors 140.1 to 140.5 (shown in FIG. 5), each family being adapted to a pressure or a given pressure range.

Figure 5:
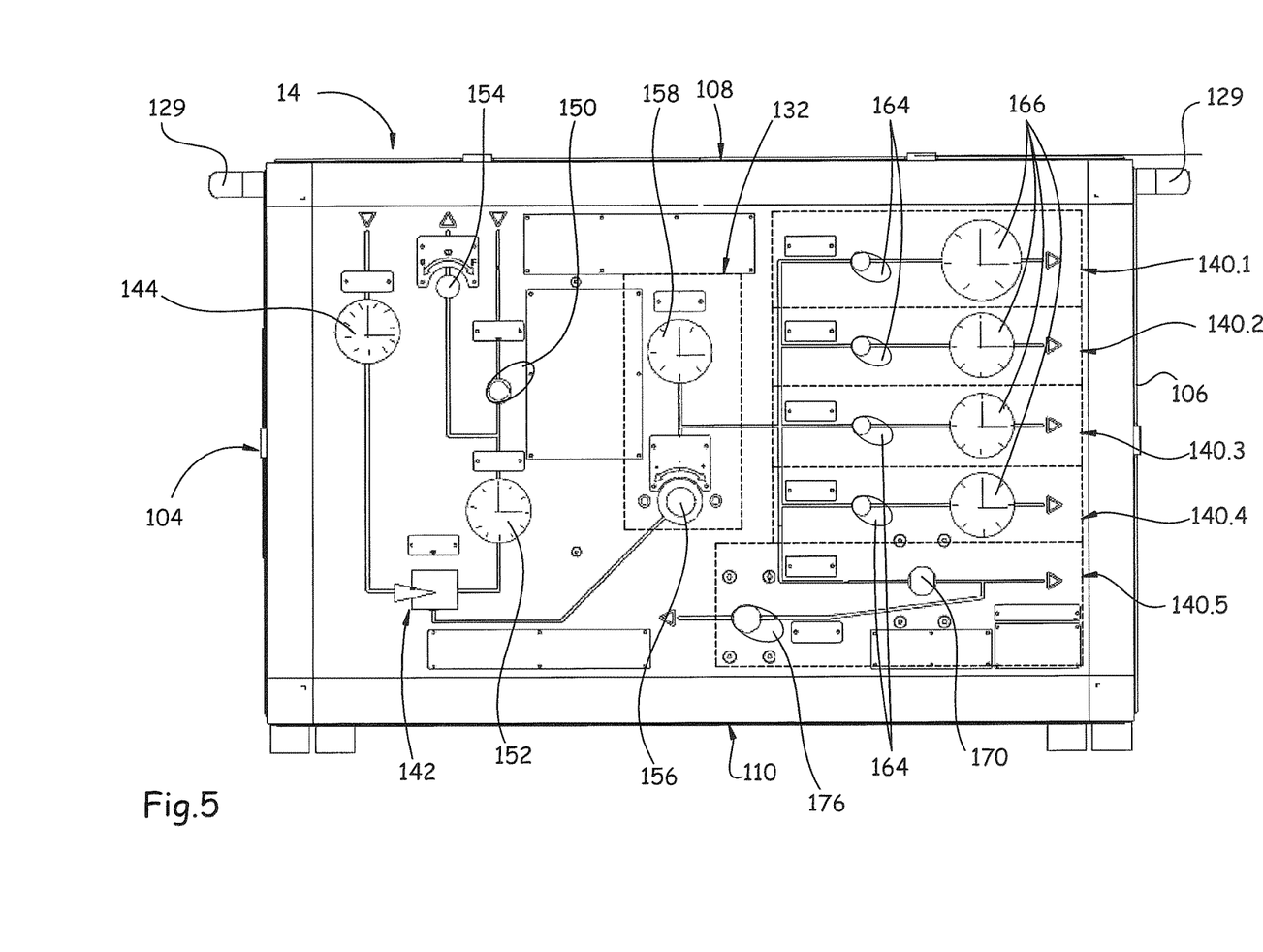
FIG. 5 is a front view of the test unit shown in FIG. 3.

By way of example, starting from the top downward, the first family 140.1 of connectors is adapted to a pressure on the order of 350 mbars, the second family 140.2 of connectors is adapted to a pressure on the order of 700 mbars, the third family 140.3 of connectors is adapted to a pressure on the order of 1.4 bars, the fourth family 140.4 of connectors is adapted to a pressure on the order of 2.1 bars, and the fifth family 140.5 of connectors is adapted to a pressure on the order of 3.45 bars or greater.

Each family can comprise one or several connectors. This arrangement allows for the test unit to be made compatible to different types of aircraft (or programs). Indeed, from one program to the next, the connectors adapted to a pressure or to a given pressure range are not all identical.

These different connectors and these different families allow for a large number of tests to be performed with a single test unit.

In addition, as shown in FIG. 3, the test unit comprises several connection means 130 at the inlet allowing for different types of pressurized gas supplies to be connected. Thus, the test unit comprises at least one inlet connector 130 adapted to compressed air and at least one inlet connector 130' adapted to pressurized gas store in a bottle, for example nitrogen or pressurized helium.

The compressed air can originate from a compressed air installation generally provided in industrial buildings. Helium and nitrogen are generally stored in bottles capable of being attached to the carriage.

According to the example shown, the test unit comprises three inlet connectors 130 with different dimensions to enable a connection to different existing compressed air installations and an inlet connector 130' adapted to a pressurized gas stored in a bottle.

Figure 6:
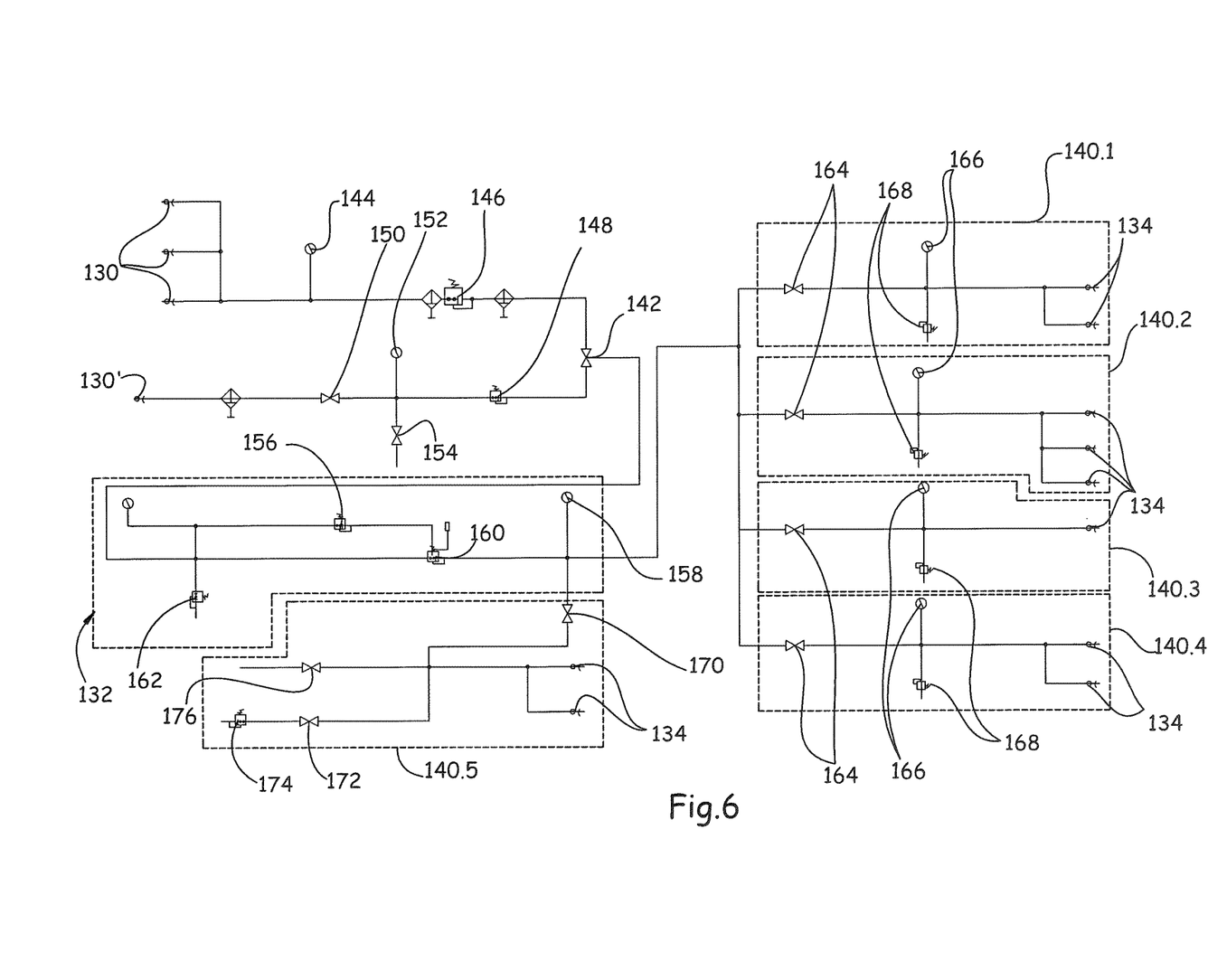
FIG. 6 is a diagram of the fluid circuit of the test unit shown in FIG. 3.

The test unit 14 further comprises a first set of conduits for connecting the different inlet connectors 130, 130' to the means 132 for regulating gas pressure and a second set of conduits for connecting the means 132 for regulating the gas pressure to the different outlet connectors 134.

The hydraulic diagram of the test unit is shown in FIG. 6.

The three inlet connectors 130 adapted to compressed air connected to an inlet of a three-way valve 142 can be seen. Between the inlet connector or connectors 130 and the three-way valve 142, a manometer 144 shown in the area of the front surface to indicate to the operator the pressure of the compressed air supply can be provided. A pressure-reducing valve 146 can also be provided so the pressure of compressed air transmitted to the regulation means 132 does not exceed a certain predetermined threshold (preferably non-adjustable by the operator). This pressure-reducing valve 146 can be comprised in a filter/pressure-reducing valve assembly.

In parallel to the compressed air supply, the inlet connector 130' adapted to gas stored in a bottle is connected to a second inlet of the three-way valve 142. The gas pressure can reach 200 bars whereas the pressure of the tests is on the order of several bars maximum, the gas must be greatly expanded. To this end, the circuit connecting the inlet connector 130' and the three-way valve 142 comprises a pressure-reducing valve 148 so that the pressure of the gas transmitted to the regulation means 132 does not exceed a certain predetermined threshold. This pressure-reducing valve 148 can be comprised in a filter/pressure-reducing valve assembly. This circuit can further comprise a valve 150, as well as a manometer 152 shown in the area of the front surface to indicate to the operator the pressure of pressurized gas supply. It can further comprise a bleed valve 154 insofar as different types of gas can circulate via this circuit.

The outlet of the three-way valve 142 is connected to the regulation means 132.

These regulation means comprise a pressure-reducing valve 156 for regulating the pressure whose control is accessible in the area of the front surface. Advantageously, they further comprise a manometer 158 (shown in the area of the front surface) for controlling the regulated pressure. The regulation means 132 can comprise protection elements such as a low pressure pressure-reducing valve 160 and/or a safety valve 162.

The regulation means 132 are connected to the different families 140.1 to 140.5 of connectors via at least one feed pipe.

Each family 140.1 to 140.4 comprises a valve 164 to enable the gas to pass at the regulated pressure toward the connector or connectors 134 of the family.

Between the valve 164 and the connector or connectors 134 of the family, a manometer 166, shown in the area of the front surface, can be provided to indicate to the operator the pressure of the gas transmitted to the fluid circuit to be tested.

According to a feature of the invention, for at least one family, a safety valve 168 is provided upstream of the outlet connector(s) 134 for the gas pressure transmitted to the fluid circuit to not exceed a certain threshold.

Thus, the safety valve 168 of the first family 140.1 is calibrated for the pressure to not exceed 350 mbars, the safety valve 168 of the second family 140.2 is calibrated for the pressure to not exceed 700 mbars, the safety valve 168 of the third family 140.3 is calibrated for the pressure to no exceed 1.4 bars and the safety valve 168 of the fourth family 140.4 is calibrated to not exceed 2.1 bars. This arrangement makes it possible to limit the risk of damaging the fluid circuit to be tested insofar as, even if the manometers and the pressure-reducing valves are defective, the pressure transmitted does not exceed a certain threshold as a function of the recommendations of the aircraft carrier.

According to an embodiment, the fifth family can be made in the same manner as the other families.

Advantageously, the circuit of the fifth family is different from the circuits of the other families. This family of connectors is more particularly adapted to tests using helium or high pressures.

It comprises a valve 170 to direct the gas calibrated by the regulation means 132 along the direction of the connectors 134.

As previously described, this circuit comprises a safety system for the transmitted pressure to not exceed a certain threshold, such as for example, a valve 172 and a safety valve 174. However, contrary to the circuits of the previous families, the safety valve is not arranged in series, sandwiched between the valve 170 and the connector 134. For the fifth family, at the outlet of the valve 170, a feed pipe supplying the connector or connectors 134 is provided, as well as a conduit comprising a valve 172 and a safety valve 174 in series.

When the valve 172 is open, this arrangement allows the safety valve 174 to become active, and consequently prevents the pressurized gas from exceeding a pressure determined and calibrated by the safety valve 174, on the order of 3.45 bars. When the valve 172 is closed, it is possible to deliver, via the connector or connectors 134 of the fifth family, a pressurized gas which exceeds the value of 3.45 calibrated by the valve 174.

In addition, this circuit comprises a bleed system 176, particularly a valve, which makes it possible to evacuate the gas present in the fluid circuit tested at a point away from the aircraft.

According to a particular arrangement, the inlet connectors 130 are arranged in the area of the left surface of the test unit when the outlet connectors 134 are arranged in the area of the right surface. The different manometers, valves, and controls of pressure-reducing valves are arranged in the area of the front surface.

Thus, the regulation means 132 are arranged in the central portion, the control valves and the manometers of the different families being arranged on the right side whereas the control valves, the manometers of gas supply are arranged on the left side.

This arrangement of the different elements provide excellent ergonomics.

To improve safety, the families are arranged on top of one another, according to an order of decreasing pressures, the lowest pressure being arranged on top, in the area of the eyes of the operator.

The operation mode is now described:

If necessary, the operator sets in place the bottles of pressurized gas on the carriage.

Subsequently, he connects the test stand to the ground with the spool 100, then checks that all the valves are in closed position in the area of the front surface.

For the tests using a pressured gas stored in bottles, he connects the outlet of the bottle to the inlet connector 130' by means of the inlet hose 136. For safety reasons, he uses a safety hook to connect the connector of the inlet hose 136 to the test unit.

For the tests using compressed air, it is possible to connect one of the connectors 130 by means of a hose to a compressed air circuit generally provided in industrial buildings.

Then, he connects the test unit and more particularly an outlet connector 134 to the fluid circuit to be tested by means of the outlet hose 138. This hose 138 comprises a valve and a manometer as close as possible to the end connected to the circuit to be tested.

As a function of the test to be performed, he selects the appropriate pressurized gas supply thanks to the three-way valve 142.

If the pressurized gas originates from a bottle, he opens the valve 150. He then opens the bottle, then verifies the pressure displayed on the manometer 152. If the pressure is insufficient to carry out the test, he opens another bottle.

If the pressurized gas is compressed air, he moves on directly to the next step.

Then, the operator regulates the outlet pressure to perform the test thanks to the control of the pressure-reducing valve 156 and to the manometer 158.

After this adjustment, he opens the valve 164 or 170 corresponding to the connector 134 used.

After the phase of filling the circuit to be tested, the operator can adjust the outlet pressure again by acting on the control of the pressure-reducing valve 156 and by reading the regulated pressure on the manometer 158.

Once the value has been reached, the operator can close the valve 164 or 170.

At the end of the test, the operator re-opens the pertinent valve 164 or 170, then adjusts the pressure of the pressure-reducing valve 156 at 0 Bar.

He can optionally bleed the tested circuit by opening the valves 170 and 176. This bleeding is recommended in the case of a test using helium for which it is preferable to evacuate helium away from the aircraft.

If the test has been carried out with a bottle, the operator closes the bottles at the end of the test. Consequently, he can bleed the circuit by opening the bleeding valve 154. He can then close the supply valve 150.

As described hereinabove, using a test stand according to the invention is relatively simple. Its design and ergonomics make it possible to limit the risks of errors and accidents during the experimentation phases.

Finally, the test unit makes it possible to carry out numerous tests, no matter the type of aircraft, the circuit tested, and the test. This feature allows for the number of test units to be limited, which contributes to a reduction of the costs and time necessary to a certification as well as the space required for storage.

The invention claimed is:

1. A device for carrying out a test on a fluid circuit of an aircraft comprising:
    a test unit comprising:
        at the inlet, a plurality of means of connection to a pressurized gas supply connected to means for regulating the pressure of the gas provided by the supply as a function of the test to be carried out;
        at least one inlet connector adapted to compressed air;
        at least one inlet connector adapted to a pressurized gas stored in a bottle; and,
        at the outlet, at least first and second connection means connected to the means for regulating the pressure of the gas, wherein the at least first and second connection means have different dimensions tailored to a range of pressures or a given pressure,
        a plurality of families of connection means, each family being adapted to a pressure range or a given pressure, wherein at least one family comprises a safety valve for maintaining the pressure delivered to the fluid circuit to be tested under predetermined threshold, said safety valve being sandwiched between a control valve and one or more of the connection means of the corresponding family, and
        wherein at least one family comprises, at an outlet of the control valve, a feed pipe supplying one or more of the connections means of the corresponding family and a conduit comprising a valve and a safety valve in series.

2. The device according to claim 1, further comprising at least one outlet hose to connect the connection means to a connection means provided in the area of the fluid circuit to be tested, said outlet hose having, at each end respectively, first and second connectors identical to one another and identical to the connection means of the test unit and to the connection means provided in the area of the fluid circuit to be tested.

3. The device according to claim 1, wherein, for at least one family, a safety valve is arranged in series with a valve connected at the outlet of a control valve, wherein the outlet of the control valve is connected to one or more of the connection means of the considered family.

4. The device according to claim 1, further comprising a three-way valve to select the inlet connection means for connecting to the regulation means.

5. The device according to claim 4, further comprising a pressure-reducing valve sandwiched between the inlet connector adapted to a pressurized gas stored in a bottle and the three-way valve.

6. The device according to claim 1, wherein the test unit is removably connected to a carriage.

7. The device according to claim 6, wherein the carriage comprises a chassis and a tiller adapted to pivot about a horizontal axis between a substantially vertical raised position and a horizontal position.

8. The device according to claim 7, wherein the carriage comprises a brake system configured to be activated when the tiller is in the raised position.

9. The device according to claim 7, wherein the carriage comprises locking means of the tiller in the raised position.

10. The device according to claim 9, wherein the locking means comprise a cross pin with, an horizontal axis, and, a vertical axis, arranged between first and second parallel plates whose upper end is configured to be housed in a housing arranged in a plate affixed to the tiller, the horizontal axis being housed in oblong holes housed in the parallel plates and oriented vertically so that the cross pin is configured to move vertically in translation, and return means tending to maintain the cross pin in the upper position.

* * * * *